US012766675B2

(12) United States Patent
Cheveralls et al.

(10) Patent No.: US 12,766,675 B2
(45) Date of Patent: Oct. 20, 2026

(54) BI-DIRECTIONAL SCREWDRIVER

(71) Applicant: STANLEY BLACK & DECKER, INC., New Britain, CT (US)

(72) Inventors: Daniel Cheveralls, Huntersville, NC (US); Christopher Laidlaw, Huntersville, NC (US)

(73) Assignee: Stanley Black & Decker, Inc., New Britain, CT (US)

( * ) Notice: Subject to any disclaimer, the term of this patent is extended or adjusted under 35 U.S.C. 154(b) by 130 days.

(21) Appl. No.: 17/600,974

(22) PCT Filed: Apr. 1, 2020

(86) PCT No.: PCT/US2020/026257

§ 371 (c)(1),
(2) Date: Oct. 1, 2021

(87) PCT Pub. No.: WO2020/206029

PCT Pub. Date: Oct. 8, 2020

(65) Prior Publication Data

US 2022/0193866 A1 Jun. 23, 2022

Related U.S. Application Data

(60) Provisional application No. 62/827,547, filed on Apr. 1, 2019.

(51) Int. Cl.
*B25B 15/04* (2006.01)
*B25B 17/00* (2006.01)

(52) U.S. Cl.
CPC .............. *B25B 15/04* (2013.01); *B25B 17/00* (2013.01)

(58) Field of Classification Search
CPC ................................ B25B 15/04; B25B 17/00
(Continued)

(56) References Cited

U.S. PATENT DOCUMENTS 3,436,992 A * 4/1969 Over ..................... B25B 13/463 81/63.1
4,485,699 A * 12/1984 Fuller ..................... B25B 15/04 81/58.3

(Continued)

OTHER PUBLICATIONS

Extended European Search Report, EP Application No. 20783694.1, Mar. 9, 2023, 8 pages, EPO.

(Continued)

*Primary Examiner* — Hadi Shakeri
(74) *Attorney, Agent, or Firm* — Kofi A. Schulterbrandt

(57) ABSTRACT

In a bi-directional screwdriver, the screwdriver may include a handle, a main housing, and a gearing assembly, which is mounted on the idle gear axle on the transmission seat and is fitted between the driving gear and the driven gear for transferring motion. When the grip ring is gripped and the handle is rotated to rotate the driving gear, the driving gear may rotate the driven gear in a reverse direction through the idle gear. The screwdriver may include a reversing means which can include a reversing member, a pawl, and a direction collar, in which the driving gear, the driven gear, and the transmission seat are all sleeved on the main housing. The reversing member may be sleeved into the main housing and able to rotate the main housing. The direction collar may engage with and rotate the reversing member, causing a change of output direction.

6 Claims, 13 Drawing Sheets

(58) Field of Classification Search
USPC ................................................................ 81/33
See application file for complete search history.

(56) References Cited

U.S. PATENT DOCUMENTS

| | | | | |
|---|---|---|---|---|
| 4,971,156 | A * | 11/1990 | Wong | F16H 3/24 74/340 |
| 5,211,086 | A | 5/1993 | Shu | |
| 5,437,212 | A | 8/1995 | Thompson et al. | |
| 5,881,609 | A * | 3/1999 | Palmer | F16H 31/002 81/58.3 |
| 6,167,787 | B1 * | 1/2001 | Jarvis | B25B 23/0021 81/177.8 |
| 9,156,145 | B2 * | 10/2015 | Wang | B25B 17/00 |
| 9,833,883 | B2 * | 12/2017 | Wang | B25B 15/04 |
| 2015/0209942 | A1 * | 7/2015 | Hongquan | B25B 13/463 81/63.1 |
| 2016/0167205 | A1 | 6/2016 | Wang | |
| 2025/0312895 | A1 * | 10/2025 | Schneider | B25B 15/04 |

OTHER PUBLICATIONS

International Search Report and Written Opinion, PCT Application No. PCT/US20/26257, Jun. 25, 2020, 11 pages, USPTO.

* cited by examiner

BI-DIRECTIONAL SCREWDRIVER

FIELD

This document relates, generally to manual tools and, in particular, to a bi-directional screwdriver.

BACKGROUND

Screwdrivers are tools used for screwing a screw to keep it in place, which includes a shaft and a handle. A general screwdriver commonly has its shaft secured to the handle. In use of hand tools common manual tools such as screwdrivers and torque wrenches, there is a certain movement limitation of the human hand in a rotational direction, namely the inability a the human hand to turn continuously in one direction. Therefore, the hand needs to stop several times during the process when an element is required to be rotated consecutively for multiple times, to allow the hand to turn reversely by an angle.

In such tools, the rotation shaft and the main shaft of the handle are coaxial, and usually the following is the case when the tools are in use: firstly, rotating the handle with hand in a desired direction (for example, tightening or loosening a screw), then the hand turns in reverse direction so that the tools can be re-positioned for another cycle. During the second portion of the above mentioned cycle, the band's reversed rotation can be achieved by re-grasping the handle after releasing it, or by the tool which is equipped with a one-way means such as a ratchet to keep the main shaft stationary during the reversed rotation of the handle, or by re-inserting the tool bit to the screw after extracting the bit from engagement with the screw.

When in use, the hand holding the handle can only turn by a small angle. One of the methods is to release the screwdriver by the hand holding it temporarily from the element to allow the hand to turn in reverse direction, which requires directing the screwdriver to the element again. Another method is to use the other hand to help and allow the hand holding the handle to release from the handle and turn in reverse direction. Obviously, both methods have inconveniences, which affect working efficiency, and the screw head is also prone to damage.

U.S. Pat. No. 9,770,813B2 discloses a ratchet tool includes a shaft member, a handle and a ratchet mechanism, in which the handle is connected to the ratchet mechanism, and the shaft member extends into the interior of the ratchet mechanism along the central axle of the ratchet mechanism from the front end of the ratchet mechanism and is connected to the ratchet mechanism. The shaft member includes a shaft and an extension portion which passes through the rear end of the ratchet mechanism along the central axle of the ratchet mechanism from the front end of the ratchet mechanism and is connected to the ratchet mechanism, and the shaft is designed to be integrated with or separated from the extension portion. Such a design of the shaft member solves the wobble problem of the shaft. The ratchet tool of the present invention requires small turning force when turning back and has strong capacity of torque transferring.

U.S. Pat. No. 6,082,226 discloses a ratchet tool including a shaft and a handle to which a direction selection collar is mounted, and a ratchet member is received in the handle. The ratchet member has inner toothed periphery and two pawl members engaged with the inner toothed periphery. The ratchet member has three dents defined in one of two ends thereof and the direction selection collar has a positioning member embedded therein which is movably received in one of the dents when rotating the collar. The collar has a rod extending between the two pawl members, the rod pivoting one of the pawl members to disengage from the inner toothed periphery by rotating the collar.

SUMMARY

An object of the present invention is to solve the problem with ordinary screwdrivers that high number of stops and rotations are required when an element is required to be rotated consecutively for multiple times.

Another object of the present invention is to provide a ratchet tool for reduced hand movement, and with a comfortable structure.

Another object of the present invention is to provide a ratchet tool for reduced hand movement, and which is easy to use.

In accordance with one aspect of the present invention, the invention is a ratchet tool comprising a handle, an end configured to selectively receive a tool bit and positioned apart from the handle, a sleeve, the sleeve covering a driving mechanism for translating a rotary motion from the handle to bit end, a reversing mechanism operatively coupled to the driving mechanism for providing multi-directional rotation of the bit end, a gear assembly, the gear assembly including a rear ring gear, a front ring gear and pinion gears overlapping the reversing mechanism and wherein the gear assembly is combined with the reversing mechanism, a plurality of pawls, each pawl held within a channel in a housing by a pin, a collar, the collar providing axial two-way movement and is operatively coupled to the reversing mechanism to provide selective one-way rotation of the working end.

This implementation of the invention, in particular, may be desired, because the structure and arrangement allow for reduced rotations and/or reduced number of stops for when an element needs to be rotated consecutively.

In another aspect, the invention is a bi-directional screwdriver, which can include a handle, a main housing, and a gearing. The gearing can include a driving gear, a driven gear, a transmission seat, and two idle gears, which are mounted on the idle gear axle on the transmission seat and are fitted between the driving gear and the driven gear for transferring motion. The handle can rotate the driving gear. A grip ring can be securely provided outside the idle gear axle. When the grip ring is gripped, and the handle is rotated to rotate the driving gear, the driving gear can rotate the driven gear in a reverse direction through the idle gears. The driving gear also can have a first inside ratchet surface, and the driven gear can also have a second inside ratchet surface. The screwdriver also includes a reversing means which can include a reversing member, four pawl members, and a direction selector, in which the driving gear, the driven gear, and the transmission seat are all sleeved on the main housing and the reversing member is located within the main housing. The pawls each include a central hole by which a pin connects each pawl to the main housing and provides a pivot axis around which the pawl can rotate. The reversing member is located within the main housing and includes a plurality of ramp elements which act upon the pawls, causing them to rotate around their pivot axis and alternatively engage or disengage with the first and second ratchet surfaces. The direction selector connects to the reversing member and provides a means by which the reversing member can be moved along the central axis of the tool, causing the mechanism to be engaged in the forward or reverse direction.

In another aspect, the invention is a bi-directional screwdriver, which includes a handle, a main housing, a gearing which includes a driving gear, a driven gear, a transmission seat and an idle gear which is mounted on the idle gear axle on the transmission seat and is fitted between the driving gear and the driven gear for transferring motion. The handle rotates the driving gear. A grip ring is securely provided outside the idle gear axle. When the grip ring is gripped, and the handle is rotated to rotate the driving gear, the driving gear rotates the driven gear in a reverse direction through the idle gear. The driving gear also has a first inside ratchet surface, and the driven gear also has a second inside ratchet surface. And the product also includes a reversing means which includes a reversing member or element, a first pawl member and a second pawl member, and a direction collar, in which the driving gear, the driven gear and the transmission seat are all sleeved on the main housing, the reversing member is sleeved into the main housing and able to rotate the main housing. The direction collar engages with and rotates the reversing member, causing a change of output direction.

The terminology used herein is for the purpose of describing implementations or embodiments only and is not intended to be limiting of the invention. As used herein, the singular forms, “a”, “an” and “the” are intended to include the plural forms as well, unless the context clearly indicates otherwise. It will be further understood that the root terms “can”, “include”, “can include”, “may”, and/or “have”, when used in this specification, specify the presence of stated features, steps, operations, elements, and/or components, but do not preclude the presence or addition of at least one other feature, step, operation, element, component, and/or groups thereof.

As used herein, the terms “comprises,” “comprising,” “includes,” “including,” “has,” “having” or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus.

For definitional purposes and as used herein “connected” or “attached” includes operation or physical, whether direct or indirect, affixed or coupled, as for example a reversing mechanism operatively coupled to the driving mechanism for providing bi-directional rotation of the bit end. Thus, unless specified, “connected” or “attached” is intended to embrace any operationally functional connection.

As used herein “substantially,” “generally,” “slightly” and other words of degree are relative modifiers intended to indicate permissible variation from the characteristic so modified. It is not intended to be limited to the absolute value or characteristic which it modifies but rather possessing more of the physical or functional characteristic than its opposite, and preferably, approaching or approximating such a physical or functional characteristic.

In the following description, reference is made to accompanying Attachments and drawings which are provided for illustration purposes as representative of specific exemplary embodiments in which the invention may be practiced. Given the following description of the specification and drawings, the apparatus and methods should become evident to a person of ordinary skill in the art. Further areas of applicability of the present teachings will become apparent from the description provided herein. It is to be understood that other embodiments can be utilized and that structural changes based on presently known structural and/or functional equivalents can be made without departing from the scope of the invention.

BRIEF DESCRIPTION OF THE DRAWINGS

The above-mentioned and other features and advantages of this invention, and the manner of attaining them, will become more apparent and the invention will be better understood by reference to the following descriptions of embodiments of the invention taken in conjunction with the accompanying and drawings.

Corresponding reference characters indicate corresponding parts throughout the several views. The exemplifications set out herein illustrate embodiments of the present invention, and such exemplifications are not to be construed as limiting the scope of the present invention in any manner.

DETAILED DESCRIPTION

A detailed description of apparatuses, methods, and systems, consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

Figure 1:
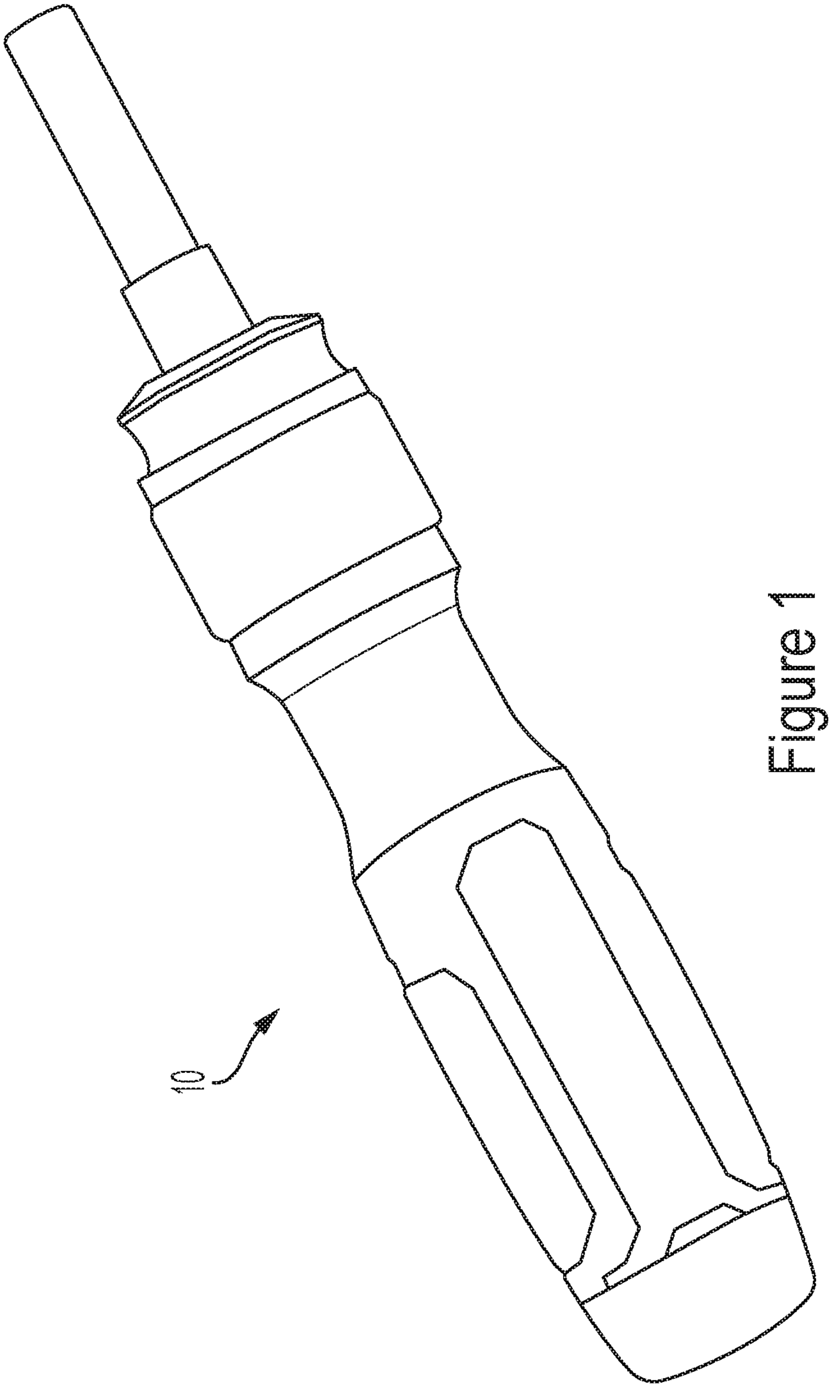
FIG. 1 illustrates a perspective view of one embodiment of a bi-directional screwdriver according to the present invention.
Figure 2:
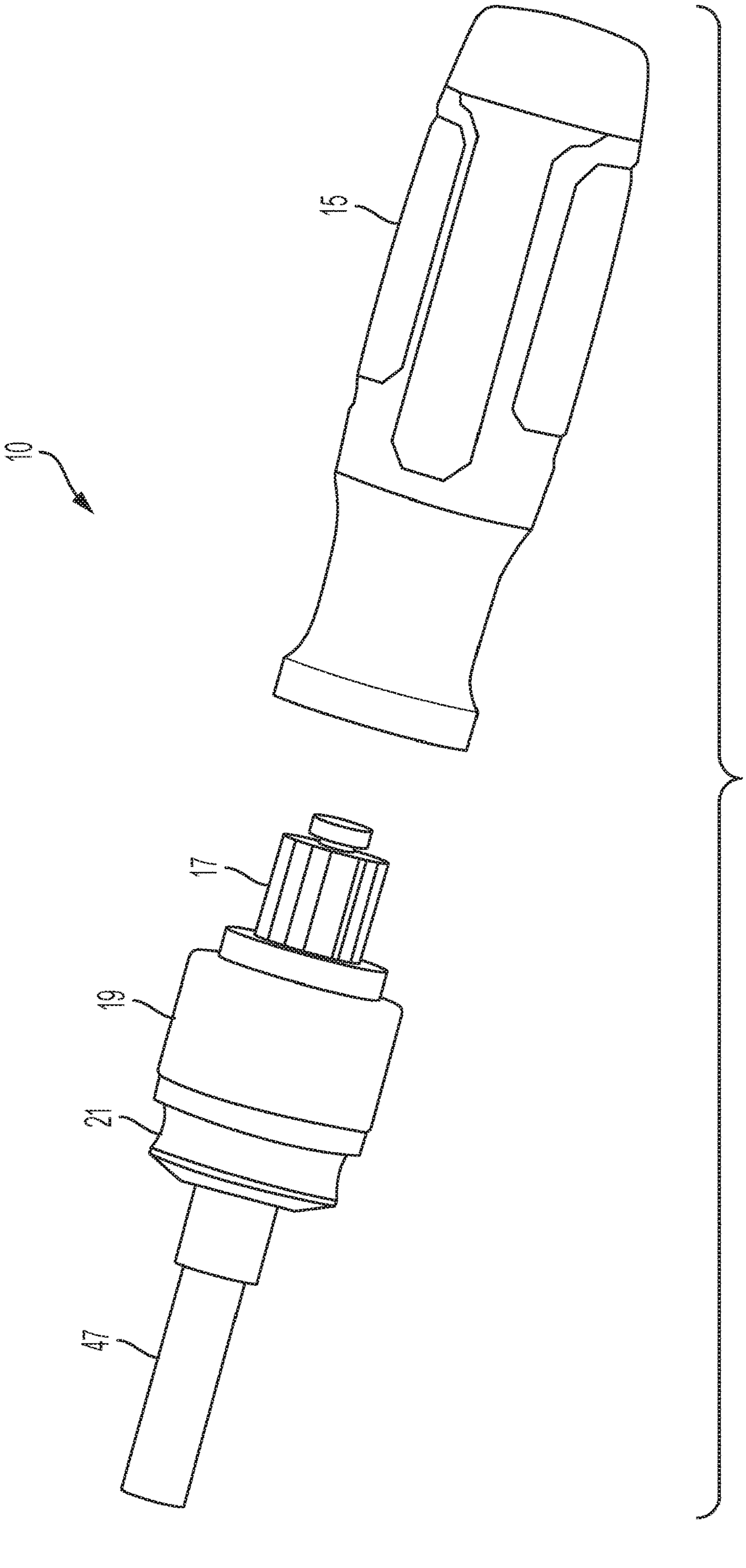
FIG. 2 illustrates a partially exploded view of a composite gearing assembly and direction collar detached from the handle of the bi-directional screwdriver of FIG. 1.
Figure 9:
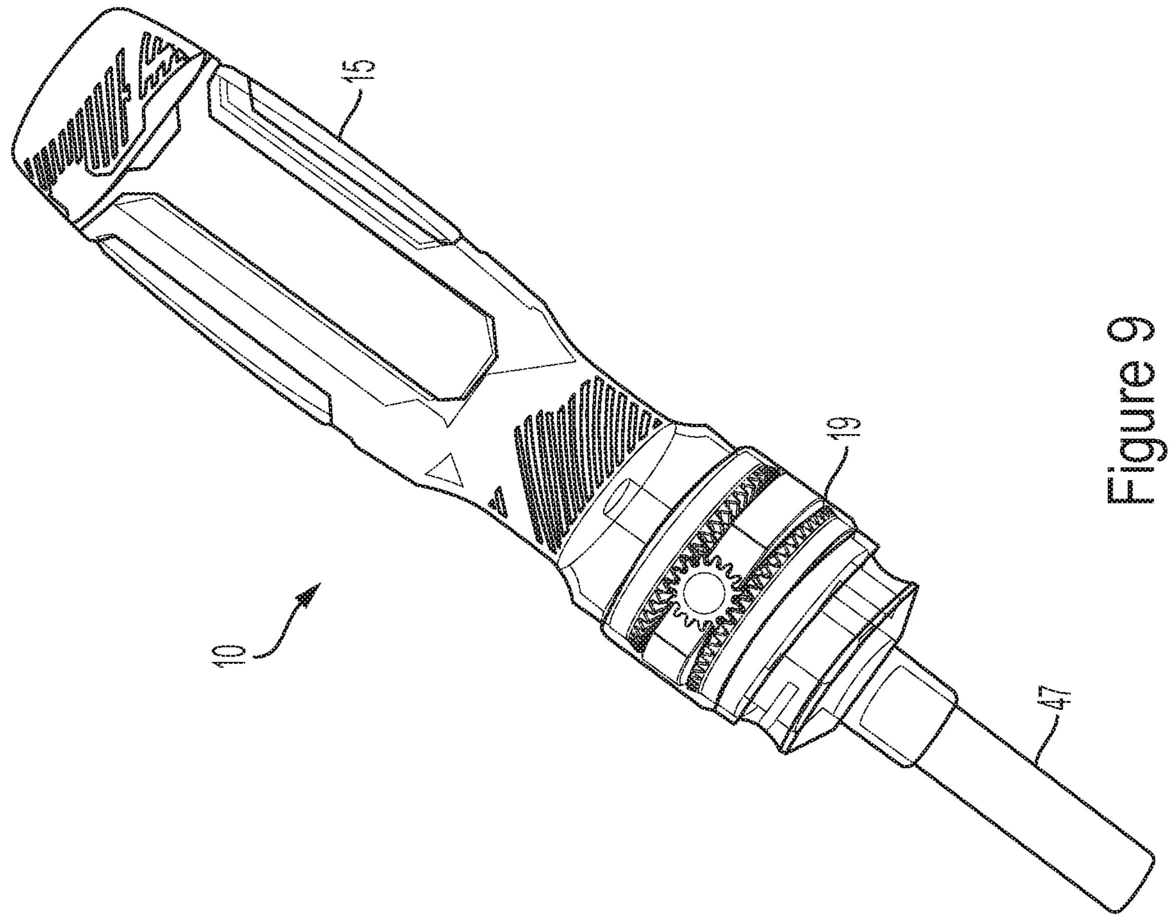
FIG. 9 illustrates a perspective, isometric view of FIG. 1.
Figure 10:
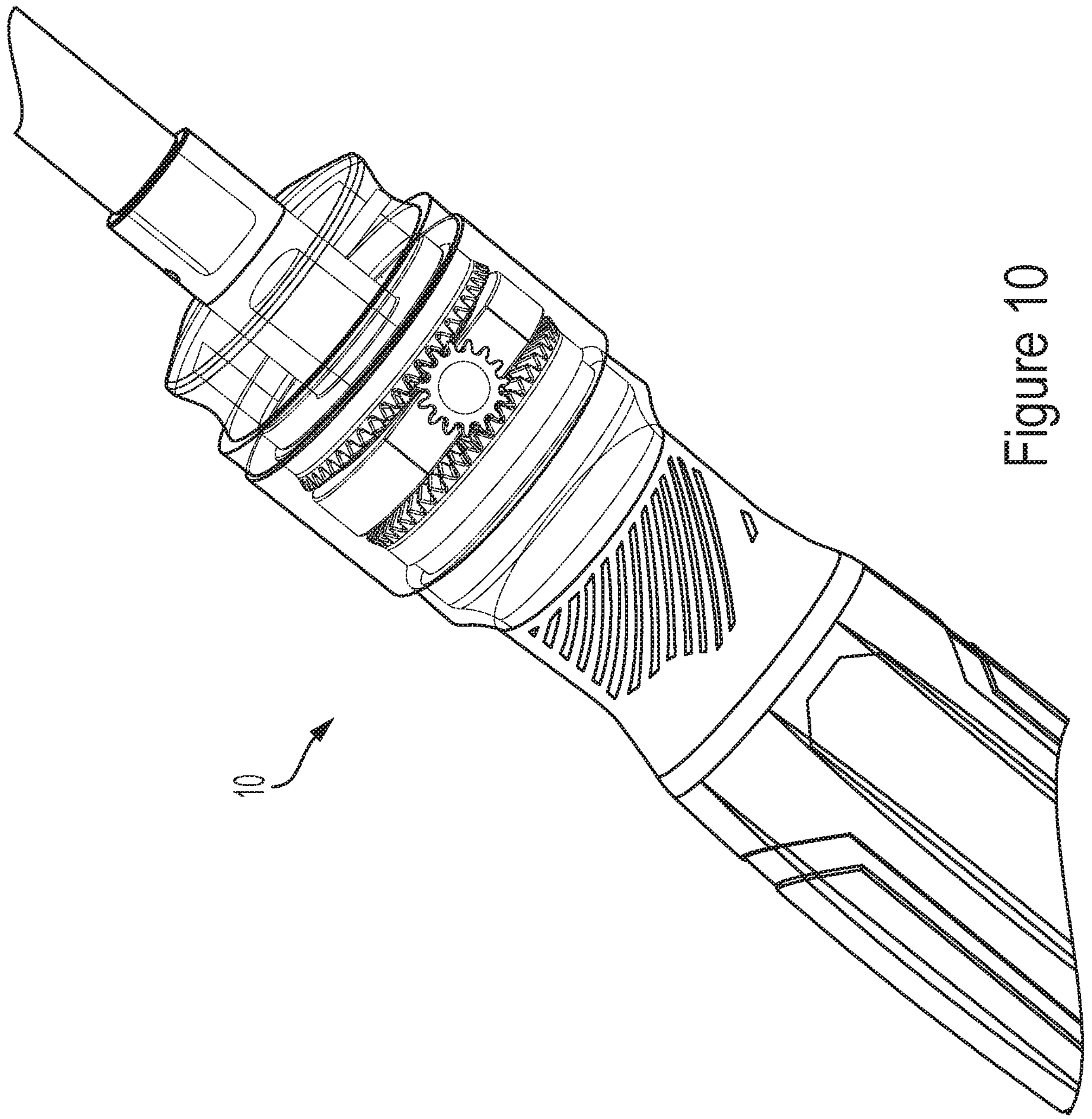
FIG. 10 illustrates a partial, isometric view of FIG. 1.
Figure 11:
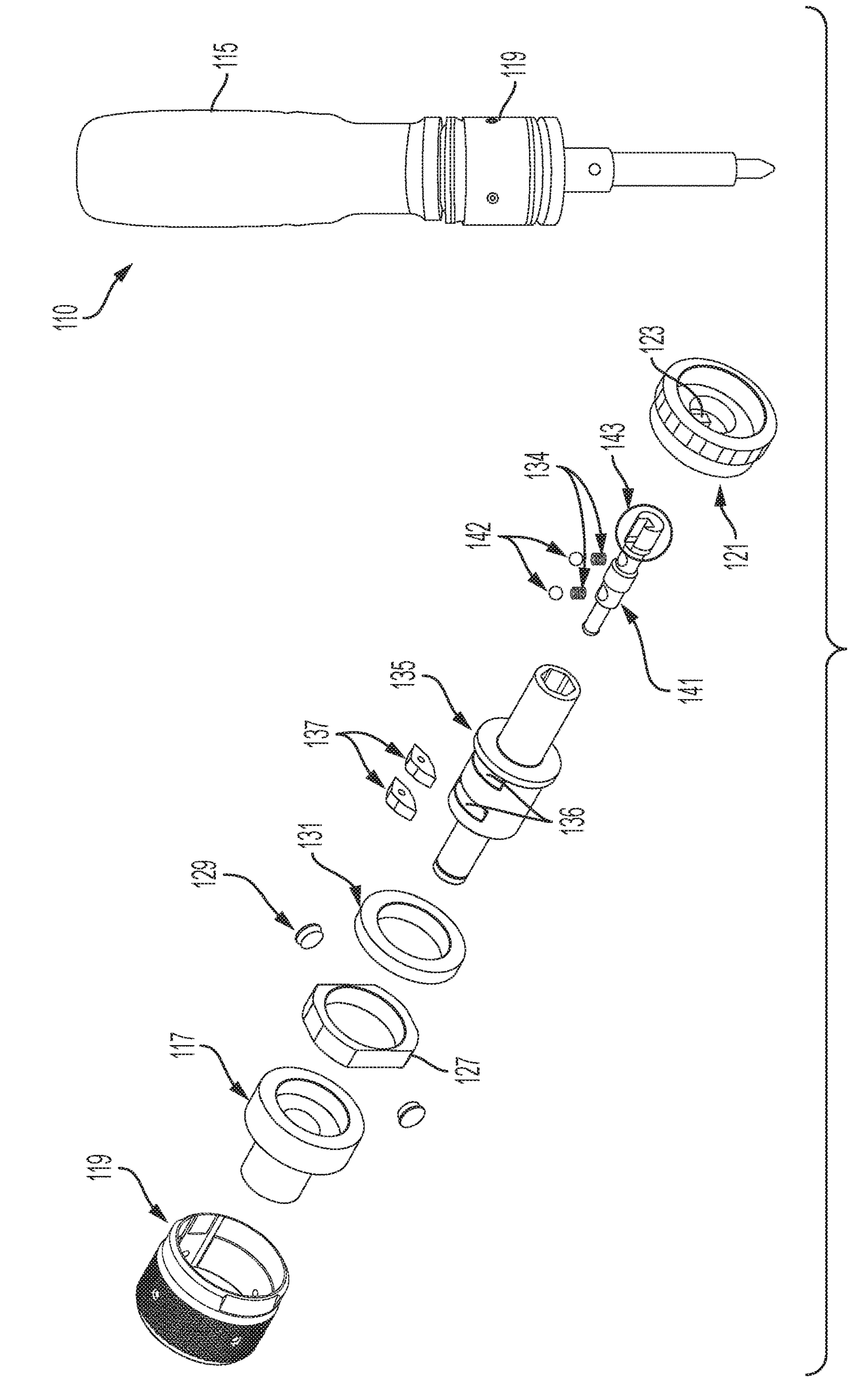
FIG. 11 illustrates a second embodiment of a bi-directional screwdriver according to the present invention.
Figure 12:
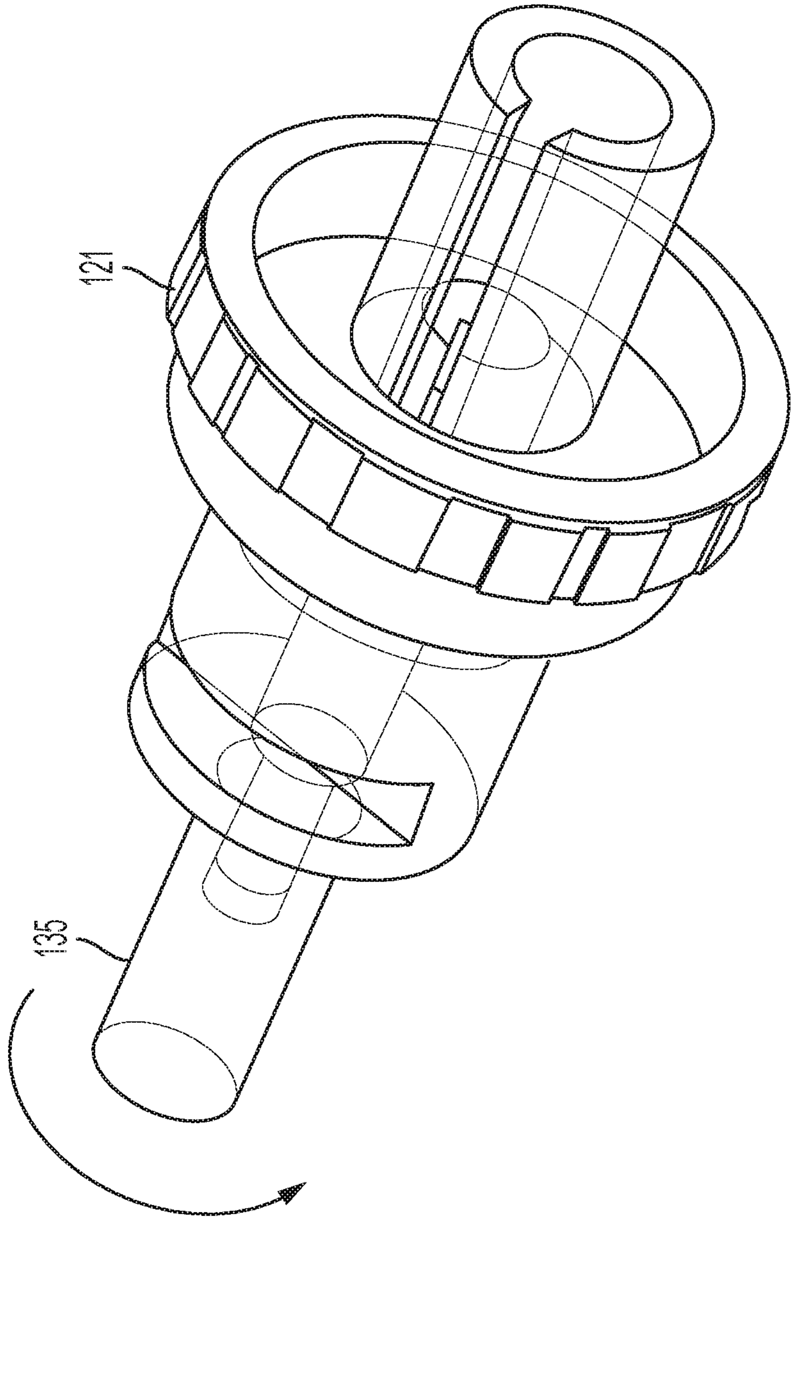
FIG. 12 illustrates a perspective, isometric view of a reversing member and direction collar of FIG. 11.

Referring to FIGS. 1-10, there are a plurality of figures of one embodiment of a bi-directional screwdriver 10. Referring to FIGS. 11-12 there are a plurality of figures of a second embodiment of a bi-directional screwdriver 110. f FIG. 1 illustrates a perspective view of the bi-directional screwdriver 10 according to the present invention. As represented in FIG. 1, the screwdriver 10 is approximately the size of a common, standard screwdriver. FIG. 2 depicts the screwdriver including a handle 15, a driving gear 17, a direction collar 21, a sleeve 19 and a bit holder 47. As shown in FIG. 2 the handle 15 may be separated from the driving gear 17 and rotation assembly of the bi-directional screwdriver 10. The driving gear 17 is shown having a spline 18 outer surface which may interact a part of the handle when a user applies a force on to the handle.

Figure 3:
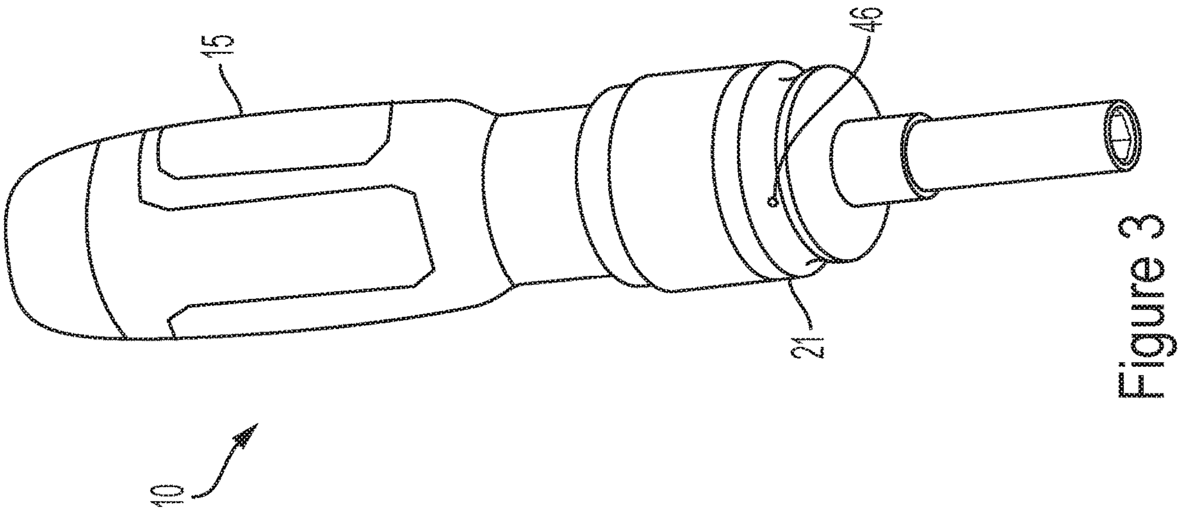
FIG. 3 illustrates a perspective view of the screwdriver of FIG. 1.

FIG. 3 illustrates a perspective view of bidirectional screwdriver 10. The direction collar 21 includes a through-hole 46 (described in detail further below) for operatively coupling to a reversing member (shown in FIG. 4A) in the screwdriver 10. Depicted in FIG. 3, the handle is illustrated having an outer surface comprised a plurality of indentations and ridges configured for easy user gripping but is not limited in this regard and may include other gripping surfaces adapted for user manipulation.

Figure 4A:
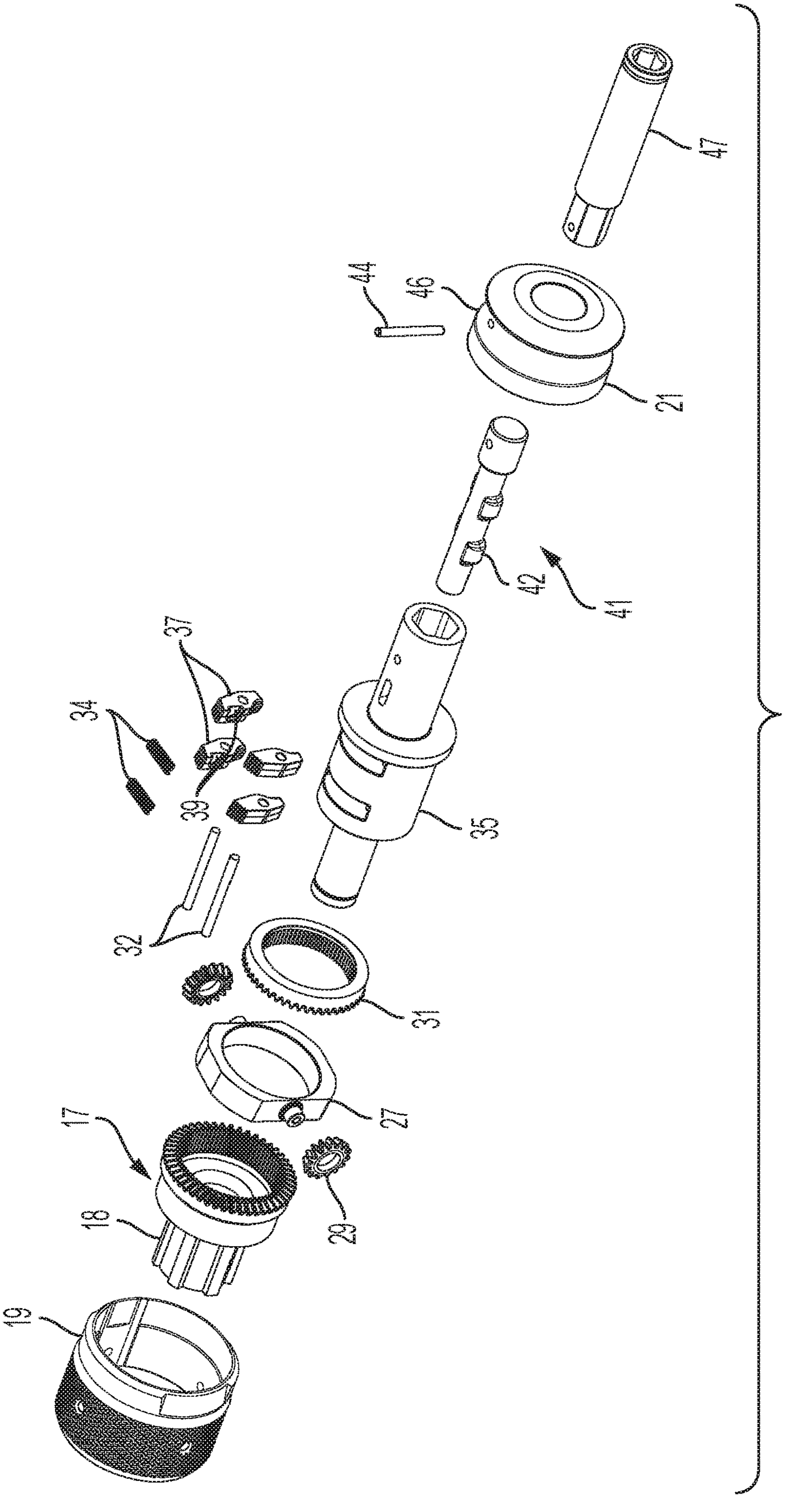
FIG. 4A illustrates an exploded view of the embodiment of the present invention according to FIG. 1.

Referring to FIG. 4A, there is illustrated an exploded view of the bi-directional screwdriver 10 according to the present invention and may include the handle 15, the main housing, and the bit holder 47. As shown in FIG. 4*a*, the screwdriver 10 may also include a grip ring (sleeve) 19, driving (rear ring) gear 17, a transmission seat 27, pinion (idle) gears 29, driven (front ring) gear 30. The screwdriver may further include a main housing 35 wherein the main housing includes two ends, each end can be operatively coupled to the driving gear 17 and a reversing member 41. The reversing member 41 may have any diameter and adapted to adapted to operatively engage with the main housing 35. The main housing may include a plurality of cavities 36 for containing a plurality of pawls 37 and can include channels 36 for aligning the pawls 37 into the main housing 35 with springs 34 and pawl pins 32. The gearing can include the driving gear 17, driven gear 31, transmission seat 27, and two idle gears 29, which are mounted on the idle gear axle on the transmission seat 27 and are fitted between the driving gear 17 and the driven gear 31 for transferring motion or rotation. The driving gear 17 includes a toothed surface on an end perpendicular to the outer ratchet surface having spline 18 outer. The driven gear 31 includes a toothed surface on an end perpendicular to the inner ratchet surface of the gear 31.

The main housing 35 is shown with an aperture 38 that can be aligned with the through-hole 43 of the reversing element 41. These components can be coupled together such as by through a pin 44 through the direction selector or collar 21 into the through-hole 43 and aperture 38. As illustrated in FIG. 4A, the grip ring 19 can be securely provided outside the idle gear axle. When the grip ring 19 is gripped, and the handle 15 is rotated to rotate the driving gear, the driving gear can rotate the driven gear in a reverse direction through the idle gears. The driving gear also can have a first inside ratchet surface, and the driven gear can also have a second inside ratchet surface. The screwdriver 10 also includes a reversing means which can include a reversing member 41, a plurality of pawl members (e.g. four pawls), and a direction selector 21, in which the driving gear, the driven gear, and the transmission seat are all sleeved (e.g. under grip ring) on the main housing 35 and the reversing member 41 is located within the main housing. The reversing member 41 may include a plurality of ramp elements 42 on the exterior and may include a through-hole, e.g. through-hole 43, configured to receive a direction collar pin 44. The pawls 37 each include a central hole by which a pin 32 connects each pawl 37 to the main housing 35 and provides a pivot axis around which the pawl 37 can rotate. The reversing member 41 is located within the main housing 35 and includes a plurality of ramp element 42 which act upon the pawls 37, causing them to rotate around their pivot axis and alternatively engage or disengage with the first and second ratchet surfaces. The direction selector 21 connects to the reversing member 41 and provides a means by which the reversing member 41 can be moved along the central axis of the tool, causing the mechanism to be engaged in the forward or reverse direction.

Figure 4B:
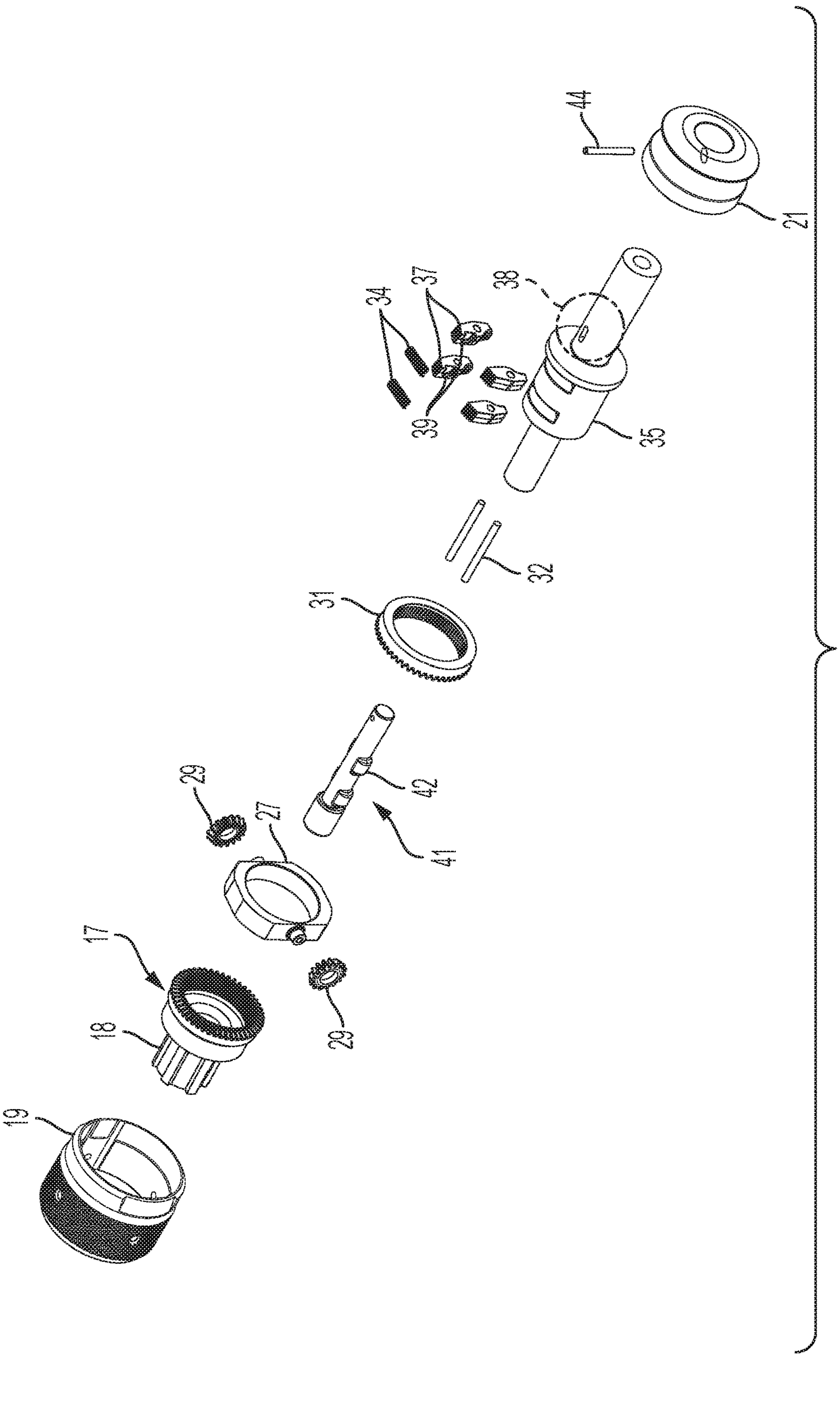
FIG. 4B illustrates another exploded view of the embodiment of the present invention according to FIG. 1.

FIG. 4B illustrates the similar exploded view of the screwdriver 10 as shown in FIG. 4A. As shown in FIG. 4*b* there is included a grip ring (sleeve) 19, driving (rear ring) gear 17, a transmission seat 27, pinion (idle) gears 29, driven (front ring) gear 30, the main housing 35 wherein the main housing includes two ends, each end can be operatively coupled to the driving gear 17 and a reversing member 41. The housing 35 is shown with an aperture 38 that can be aligned with the opening 43 of the reversing element 41. These components can be coupled together such as by through a pin 44 through the direction selector or collar 21 into the opening 43 and aperture 38. In at least one embodiment, the handle 15 (not shown) can assist to rotate the driving gear 17.

Figure 5:
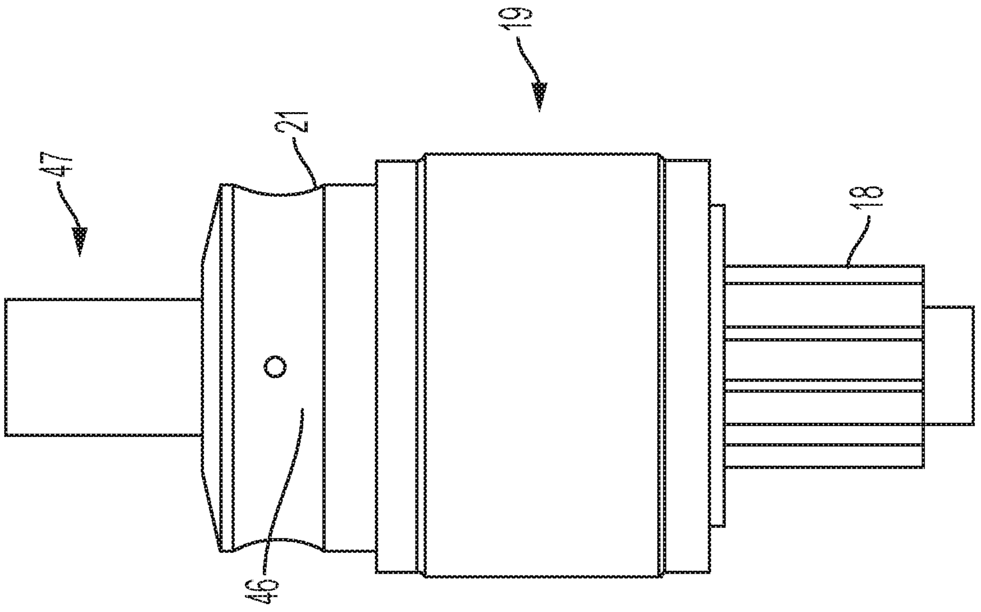
FIG. 5 illustrates a front view of the composite gearing assembly and direction collar of FIG. 2.
Figure 6:
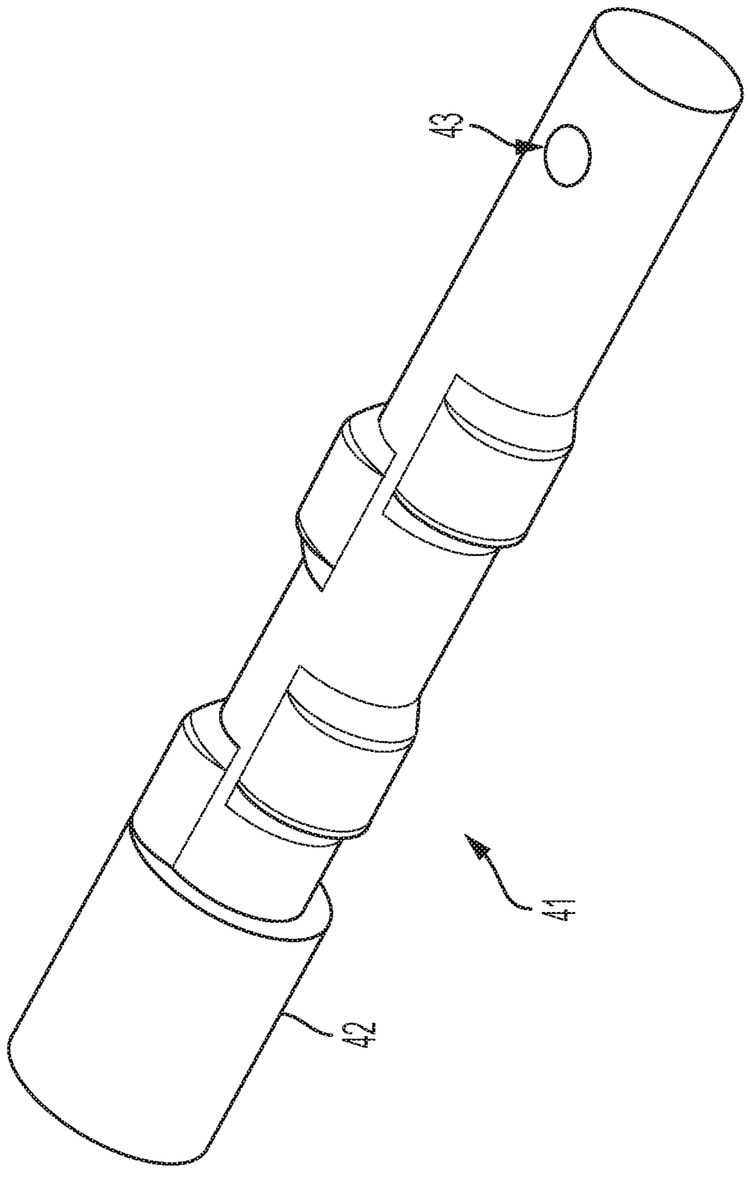
FIG. 6 illustrates a perspective view of one embodiment of a reversing member according to the present invention.

FIG. 5 illustrates assemblies separate from the handle 15 as shown in FIG. 2 where it is depicted the driving gear 17, the direction collar 21, the sleeve 19 and the bit holder 47. In FIG. 5, it is illustrated that the collar 21 may move axially forward and back. The collar 21 may be connected directly to the reversing element/member 41 with no helical slot or button arm. FIG. 6 illustrated the reversing member 41 as the reversing switch or mechanism. The illustrated design of the screwdriver 10 may include an aperture or through-hole 43. Also illustrated in FIG. 6 is the reversing member 41 may include a ramp element 42 on its outer surface configured to engage with the pawls 37. The ramp element 42 may include be an embossed or protruded feature configured to interact with at least one pawl 37 to actuate linear motion that changes the direction of the pawl. Alternately, the reversing member 41 may include a ramp element 42 that is debossed or indented (not shown) on its outer surface configured to interact with the pawls 37. In this alternate, the ramp element 42 may be configured to receive the pawls to cause linear motion that changes the direction of the pawl.

Figure 7B:
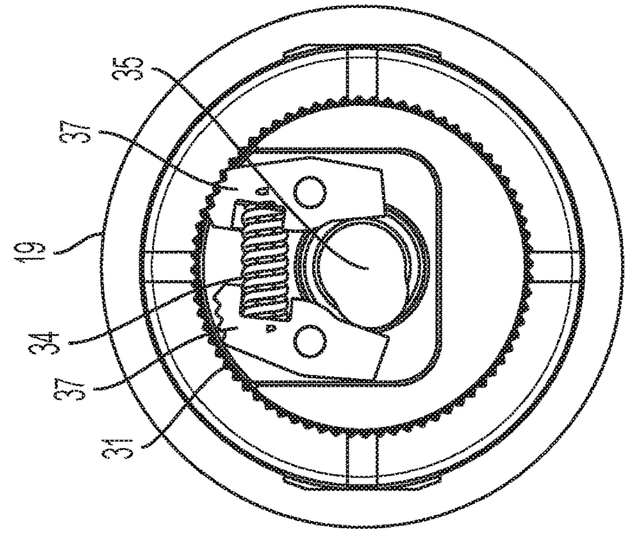
FIG. 7B illustrates a cutout, front view of the main housing and pawl configuration of FIG. 7A as assembled.
Figure 7A:
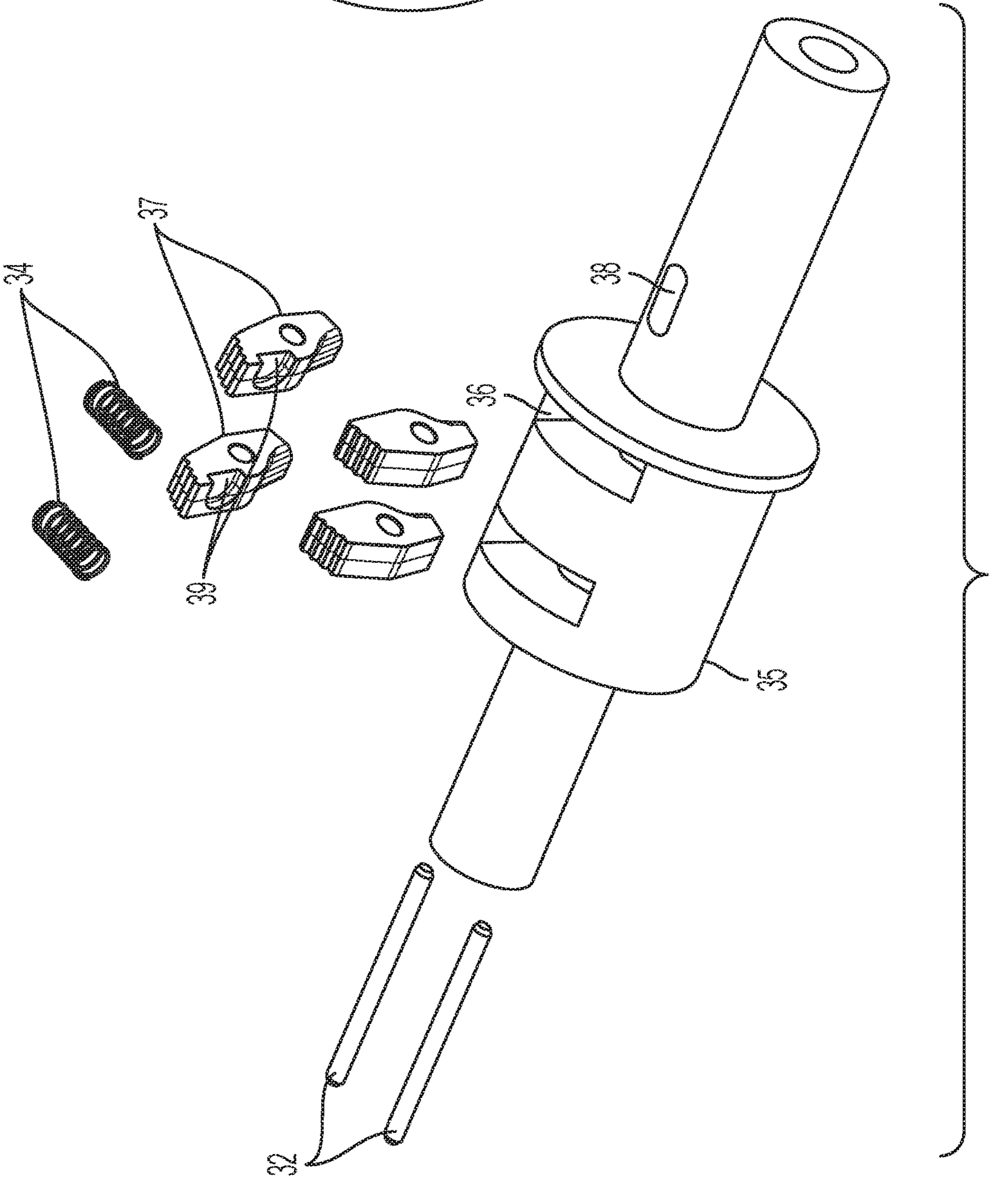
FIG. 7A illustrates a right perspective view of one embodiment of a main housing and pawl configuration according to the present invention.

Referring to FIG. 7A, it is illustrated the reversing means which may include a reversing member 35, and a plurality of pawl members 37. The housing of the reversing member 35 includes a plurality of channels 36 by which each pawl 37 can be contained and coupled into the housing 35 by pins 32. Each pawl 37 may have a plurality of teeth to engage either driving gear 17 or driven gear 31 (ring gear). In this embodiment shown the pins 32 may be inserted (not shown) into the reversing mechanism 36 or member on a plane perpendicular to the channels 36. In the cavities 36 the pawls 37 may interact with springs 34 to cause the pawls 37 to engage or disengage with the first and second ratchet surfaces, such as for example gears 17 or 31. Each pawl may have aperture (FIG. 4B) throughout to receive the pins 32. Each of the pawl 37 may have a recess 39 configured to receive at least a portion of the spring 34. Each recess may be configured provide surface mating to the spring 34 in the spring retention and reduce spring displacement. FIG. 7B illustrates a cutout, front view of the screwdriver depicting the placement of the pawl 37 into the channel 36 of the main housing 35 and surrounded by the driving gear 17 and driven gear 31. The main housing 35, driving gear 17 and driven gear 31 are shown contained within the sleeve 19. Also shown are the springs 34 placed into the recess 39 of the pawls 37, the springs 34 and pawls 37 configured to act upon each other to engage and disengage the driving gear 17.

Figure 8:
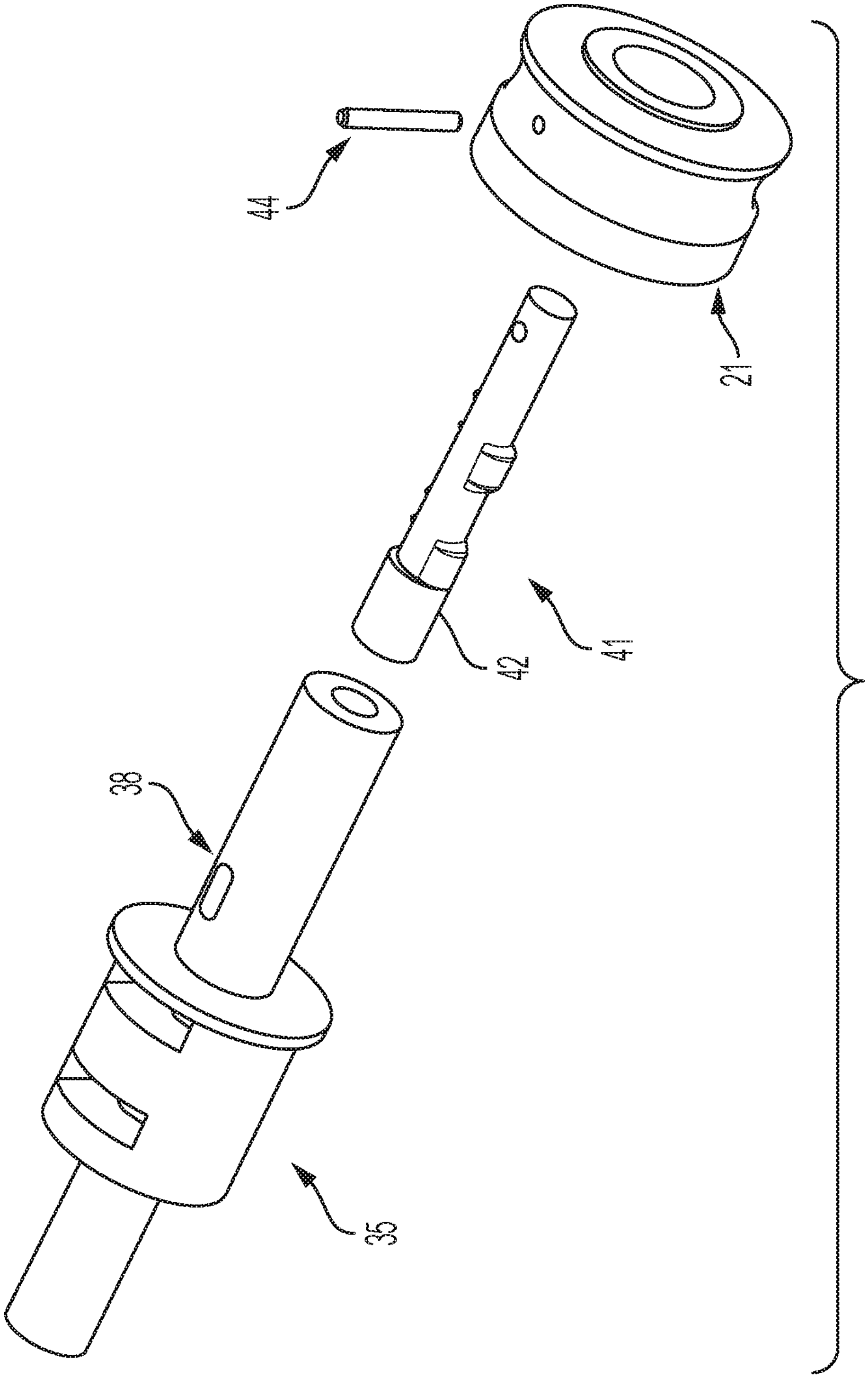
FIG. 8 illustrates a right perspective view of one embodiment of the reversing mechanism according to the present invention.

FIG. 8 illustrates the housing 35 including a guideway or slot 38. The housing is also illustrated to operatively couple the reversing member 41. The reversing member 41 may include the ramp element 42 on the exterior and may include a through-hole, e.g. through-hole 43, configured to receive a direction collar pin 44. The reversing member may be located within the main housing 35 and includes a plurality of ramp features or ramp element 42, such as ramps, embossment, debossment, molded ridges, protrusion, or recesses which are configured to operatively engage with the pawls 37, causing linear motion of the pawls and the pawls to rotate around their pivot axis and alternatively engage or disengage with the surfaces of the driving gear 17 and driven gear 31. The direction selector 21 may connect to the reversing member 41 and provides a means by which the reversing member 41 can be moved along the central axis of the tool 10, causing the reversing mechanism to be engaged or actuate in a forward or reverse direction of the bit holder 47.

Referring now to FIG. 9, there is illustrated an isometric view of the bi-directional screwdriver 10 with the various housings 35, reversing member 41, gear assembly, sleeve or grip ring 19 and collar 21 assembled together. FIG. 9 depicts a semi-transparent view of the bi-directional screwdriver, which can include the handle 15, the sleeve 19 and the bit holder 47. Shown inside of the screwdriver 10 and coupled to the bit holder 47 is the gearing assembly (e.g. driving gears 17, pinion gears 29, driven gear 31), reversing element 41, plurality of pawls 37, and direction collar pin 44 substantially enclosed within the sleeve 19. FIG. 10 depicts another perspective, internal view of the screwdriver 10. FIG. 10 shows a closer, in-depth view of FIG. 9 and inside the screwdriver 10 illustrating how the components are structured and operatively coupled together to form the bi-directional screwdriver 10.

Referring to FIG. 11, there is illustrated a plurality of figures of a second embodiment of a bi-directional screwdriver 110. The bi-directional screwdriver 110, which includes a handle 115, a main housing 135, a gearing assembly which may include a driving gear 117, a driven gear 131, a transmission seat 127 and an idle gear 129 which is mounted on the idle gear axle on the transmission seat 127 and is fitted between the driving gear 117 and the driven gear 131 for transferring motion. The handle 115 rotates the driving gear 117. A grip ring or sleeve 119 is securely provided outside the idle gear axle. When the grip ring 119 is gripped, and the handle 15 is rotated to rotate the driving gear 117, the driving gear 117 rotates the driven gear 131 in a reverse direction through the idle gear. The driving gear 117 also has an inside ratchet surface, and the driven gear also has an inside ratchet surface. In this embodiment, the driving gear 117 is depicted without a rack or spline, such as the spline 18 shown on driving gear 17 in FIG. 4A, but may have any arrangement adapted to assist in the rotation of the tool 110.

The tool 110 may have a reversing means which includes a reversing member 141, a first pawl member 137*a* and a second pawl member 137*b*, and a direction collar 121, in which the driving gear 117, the driven gear 131 and the transmission seat 127 are all sleeved on the reversing member 141, the reversing member 141 is sleeved into the main housing 135 and able to rotate the main housing 135. In this embodiment, two pawl members 137*a*,137*b* are shown but may include lesser or more members to achieve the desired result. The reversing member 141 is shown as including balls 142 and springs 134, and a straight slot 143 for receiving a protrusion from the direction collar 121. In this embodiment, the balls 142 and spring 134 may be configured to operative interact with the pawls 137. The direction collar 121 may engages with and rotates the reversing member 141, causing a change of output direction.

FIG. 12 illustrates and describes the operational design of the direction collar 121 operatively coupled to the tool bit housing 135. The direction collar 121 is shown enclosed on the housing 135 and is rotatable around the tool bit housing 135 around an axis (Arrow). The collar may also directly connect to the reversing member 141 without a helical slot or button arm. The direction collar may include a protrusion 123 from the interior of the direction collar 121 and configured to connect or secure the direction collar 121 to the reversing member 141. As shown in FIGS. 11 and 12, the reversing member has channel 136 for placement of the pawls 137 and the reversing element 141 has a straight slot 143 that may receive the protrusion 123. In various embodiments, the direction collar need not include a protrusion 123 and may be adapted to rigidly connect to the reversing member such as by screwing on or snapping onto.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described can include various combinations and/or sub-combinations of the functions, components and/or features of the different implementations described.

What is claimed is:

1. A screwdriver tool comprising:

a handle having an end configured to selectively receive a tool bit and positioned apart from the handle;

a sleeve, the sleeve at least partially covering a driving mechanism for translating a rotary motion from the handle to bit end;

a single reversing member operatively coupled to the driving mechanism for providing omni direction rotation of the bit end, the reversing member located within a main housing;

a gear assembly, the gear assembly including a driving gear, driven gear, a transmission seat, and two idle gears which are mounted on an idle gear axle on the transmission seat and are fitted between the driving gear and the driven gear for transferring motion;

a plurality of pawls, each pawl held within a channel of the main housing and adapted to interact with at least one of the driving gear and driven gear, and wherein the reversing member is located within the main housing, the reversing member including a pawl engagement surface; and a collar, the collar providing axial two-way movement and the collar operatively coupled to the reversing mechanism to provide selective one-way rotation of the working end, and wherein engagement between the pawl engagement surface and the plurality pawls is a ramped engagement and the ramped engagement is in the axial direction such that moving the reversing member axially along a central axis causes the pawls to pivot about a pawl pivot axis.

2. The screwdriver tool of claim 1, wherein the single reversing member includes a plurality of channels configured to contain a plurality of springs and the pawls.

3. The screwdriver tool of claim 2, wherein the driving gear has a toothed inside ratchet surface, and the driven gear has a toothed inside ratchet surface.

4. The screwdriver tool of claim 1, wherein the single reversing member includes a reversing member having one of ramps, embossment, debossment, molded ridges, protrusions, recesses, detent balls and springs, cam, lobe or a combination thereof for said ramped engagement with the main housing.

5. The screwdriver tool of claim 4, wherein the reversing member is located within the main housing and includes a plurality of ramp element located on the exterior which act upon at least one pawl, causing linear motion of at least one pawl wherein at least one pawl rotates around a pivot axis and alternatively engage or disengage with the ratchet surfaces of at least one of the driving and driven gear, and wherein a direction selector connects to the reversing member and provides a means by which the reversing member can be moved along the central axis of the tool, causing the mechanism to be engaged in the forward or reverse direction.

6. The screwdriver tool of claim 1, wherein the single reversing member includes a reversing member, and a direction selector, wherein the driving gear, the driven gear, and the transmission seat are all sleeved on the main housing.

* * * * *